March 8, 1932. F. W. FARLEY 1,848,704
ARTIFICIAL BAIT OR LURE
Filed April 5, 1930
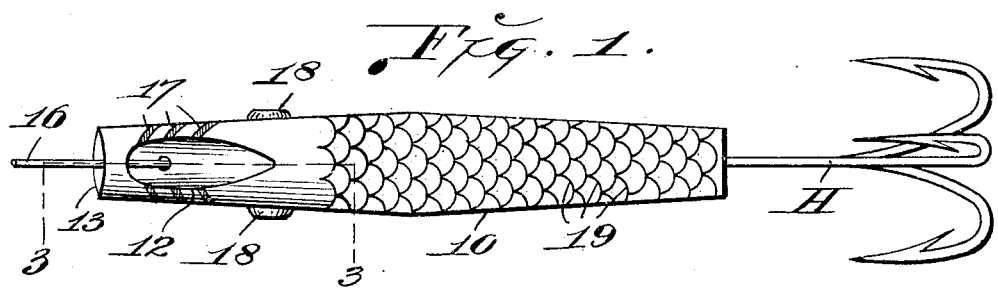
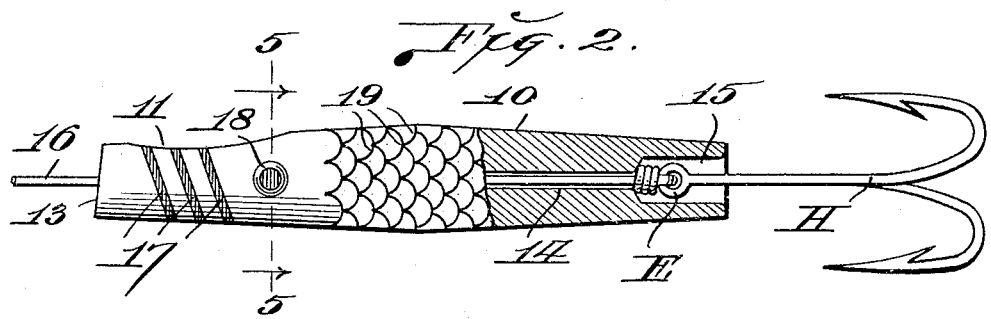
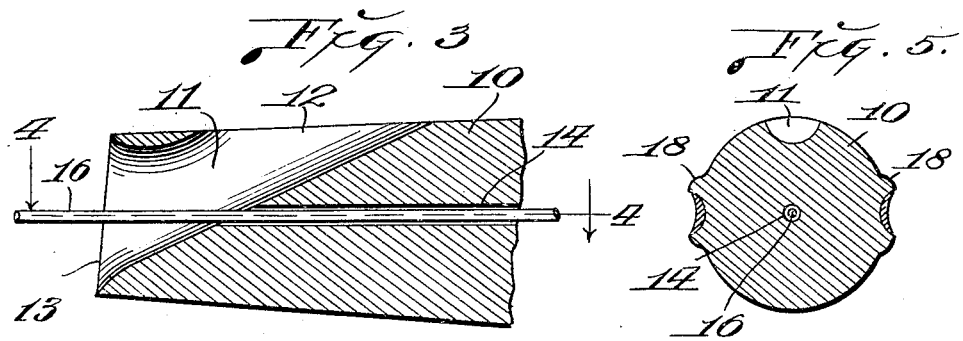
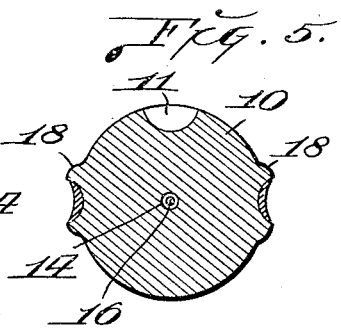
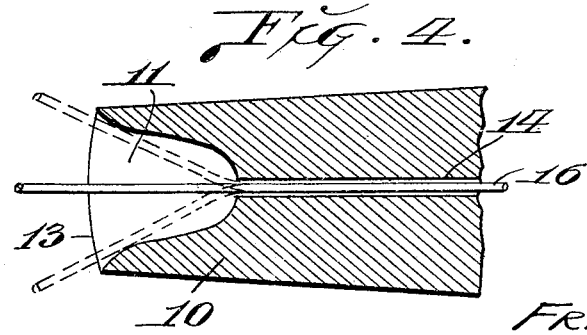
INVENTOR:—
FRED W. FARLEY.
By Martin O. Smith,
ATTY.

Patented Mar. 8, 1932

1,848,704

UNITED STATES PATENT OFFICE

FRED W. FARLEY, OF LOS ANGELES, CALIFORNIA

ARTIFICIAL BAIT OR LURE

Application filed April 5, 1930. Serial No. 442,007.

My invention relates to an artificial bait or lure and has for its principal object the provision of a fishing bait or lure that is relatively simple in construction, inexpensive of manufacture and which when trolled or drawn through the water, will simulate the movements and appearance of a minnow.

Further objects of my invention are, to provide a fishing bait or lure that is formed from a single piece of material, preferably light weight metal so that it will tend to sink rather than to float as it is trolled or drawn through the water, further to form through the forward portion of the body of the lure, an inclined opening so that the lure, as a result of the pressure of water passing through said opening will be caused to dart in different directions after the manner of a live minnow as it is trolled, further to construct the lure so that it may be mounted upon a leader, preferably formed of wire, and which passes axially through the body of the lure, further, to relatively arrange the body of the lure and the leader so that the lateral darting movements of the lure as well as the vertical darting movements thereof, will be limited, thereby simulating the darting movements of a live minnow in the water and further, to provide a lure having a recess in its rear end portion for the reception of the eye of the hook or hooks that are attached to the rear end of the leader.

Further objects of my invention are, to provide an artificial bait or lure having its surface constructed so as to imitate the scales of a natural minnow and further, to construct the forward end of the body of the lure so that it will offer a minimum degree of resistance to the water through which the lure is trolled.

With the foregoing and other objects in view, my invention consists in certain novel features of construction and arrangement of parts that will hereinafter be more fully described and claimed and illustrated in the accompanying drawings, in which:

Fig. 1 is a top plan view of a fishing lure constructed in accordance with my invention.

Fig. 2 is a side elevational view of the lure with the rear end portion thereof in vertical section.

Fig. 3 is an enlarged vertical section taken on the line 3—3 of Fig. 1.

Fig. 4 is a horizontal section taken on the line 4—4 of Fig. 3.

Fig. 5 is an enlarged cross section taken on the line 5—5 of Fig. 2.

Referring by numerals to the accompanying drawings which illustrate a practical embodiment of my invention. 10 designates a substantially cylindrical body of light weight metal, preferably aluminum and which tapers slightly from an intermediate point toward both ends.

Formed through the forward portion of the body 10 is an opening 11 that is inclined relative to the axis of the body and the rear end of the opening which terminates on the external surface of the body 10 a short distance from its forward end is in the form of an elongated oval opening 12 which gradually tapers in width toward its rear end, as illustrated in Fig. 1.

The forward end of this opening 11 is in the form of a circle and it coincides with the circumference of the forward end of the body 10 and as a result of such arrangement and construction a relatively sharp circular edge 13 is formed at the forward end of the body so that as said body is trolled the resistance to forward movement is minimized.

The front end of the body 10 is formed so that the sharp circular edge occupies a slightly inclined position with its lower portion in advance of its upper portion and as a result, the lower portion of the body of the lure cuts through the water in advance of the upper portion and such action tends to cause the lure to dip or move downward while being trolled.

Extending axially through the body 10 is a small diameter bore 14, the rear end of which communicates with a short recess 15 that is formed in the rear end of body 10.

The forward end of bore 14 communicates with the inclined bottom of the opening 11.

When the lure is applied for use, a leader 16, usually a suitable length of wire, extends through bore 14 and the rear end of this leader is secured in the conventional manner to the eye E of a single or multiple fish hook H.

As a result of this arrangement, the eye E of the hook occupies a position a short distance to the rear end of the body 10, as illustrated in Figs. 1 and 2.

Formed on the sides of the forward portion of the body 10 and extending downwardly and rearwardly from the front portion of opening 12 is a series of parallel grooves 17 that are filled with red enamel or similar hard, waterproof material and these colored stripes are intended to represent gills and to add to the general bright appearance of the lure.

Formed integral with the sides of the body 10, slightly to the rear of the gill representing members, are circular lugs 18, in the outer faces of which are formed recesses that are filled with bright coloring substance, for instance, red, blue or green enamel. As illustrated in Fig. 5, the coloring substance in the recesses in the lugs 18 is positioned below the outer faces of the lugs and thus said colored substance is protected against chipping or breakage as a result of contact with hard surfaces, for instance, a boat or some part of the accessories or paraphernalia generally carried by anglers.

In order to produce the effect of scales on the surface of the body 10, said surface is provided with semi-circular grooves or indentations 19 that somewhat resemble the shape of fish scales and these grooves or indentations are filled with hard substance, such as enamel, and which substance may be distinctively colored, for instance, red, blue, green or yellow.

When my improved lure is in use, it is loosely mounted on the rear portion of a leader 16 with the eye of the hook or hooks positioned in the recess 15 and the lure is trolled or drawn forwardly through the water.

Inasmuch as the lure is formed of metal and the lower portion of the sharp circular edge 13 is slightly in advance of the upper portion of said sharp edge, the lure will tend to sink below the surface of the water, rather than to float thereupon and as the lure is drawn forwardly a small column of water will flow through the inclined opening 11 and the pressure of this column of water against the inclined bottom of the opening will cause the lure to dart or move quickly in angular directions relative to a straight forward path of travel and thus the lure will simulate the movements of a live minnow.

The lateral and vertical darting movements of the lure while it is being trolled, are controlled by the leader, and the particular construction of the forward end of the lure for as the lure darts in any direction, the forward edge of the inclined opening will engage against the leader, as shown by dotted lines in Fig. 5, thus bringing the lateral or vertical darting movement to a stop and causing lure to dart or move in another direction.

These darting movements of the lure, together with the bright appearance thereof, serves to attract fish and in the event of a strike the fish will be caught on the hook or hooks that project from the rear of the body of the lure.

Thus it will be seen that I have provided an artificial bait or lure that is relatively simple in construction, inexpensive of manufacture and very effective in performing the functions for which it is intended. The forward end of the lure is constructed so as to permit the lure to be drawn through the water with minimum resistance and the construction of the forward end of the lure and its relation to the leader on which the lure is mounted causes the lure to dart both laterally and vertically as it is drawn through the water and the area of travel of the lure during such darting movements is limited.

It will be understood that minor changes in the size, form and construction of the various parts of my improved artificial bait or lure may be made and substituted for those herein shown and described without departing from the spirit of my invention, the scope of which is set forth in the appended claims.

I claim as my invention:

1. In a fishing lure, a substantially cylindrical body having a blunt forward end that is disposed substantially at right angles to the axis of the body and provided in its forward portion with an inclined opening, the forward end of which opening coincides with the circumferential edge of the blunt forward end of the body of the lure.

2. A fishing lure as set forth in claim 1 and said circumferential edge being sharpened.

3. A fishing lure as set forth in claim 1 and with an axial bore extending through said body the forward end of which axial bore communicates with the lower intermediate portion of said inclined opening.

4. The combination with a leader and a hook secured to the rear end thereof, of a substantially cylindrical lure provided with an axial bore for the accommodation of said leader, there being a recess formed in the rear end of the lure body for the reception of the eye of the hook that is connected to said leader there being an inclined opening formed through the forward portion of the lure body and the forward end of which opening coincides with the circumferential edge of the forward end of said lure body.

5. In a fishing lure, a substantially cylindrical body provided in its forward portion with an inclined opening, the forward end of which opening coincides with the circumferential edge at the forward end of the body of the lure and which circumferential edge is sharp and occupies an inclined plane so that its lower portion is in advance of its upper portion.

In testimony whereof I affix my signature.

FRED W. FARLEY.